(12) United States Patent
Cheung et al.

(10) Patent No.: US 8,247,070 B2
(45) Date of Patent: Aug. 21, 2012

(54) CRYSTALLINE NANOSTRUCTURES

(76) Inventors: Barry Chin Li Cheung, Lincoln, NE (US); Joseph Reese Brewer, Lincoln, NE (US); Nirmalendu Deo, Lincoln, NE (US)

(*) Notice: Subject to any disclaimer, the term of this patent is extended or adjusted under 35 U.S.C. 154(b) by 431 days.

(21) Appl. No.: 12/447,836

(22) PCT Filed: Oct. 30, 2007

(86) PCT No.: PCT/US2007/083037
§ 371 (c)(1),
(2), (4) Date: Jan. 26, 2010

(87) PCT Pub. No.: WO2008/127393
PCT Pub. Date: Oct. 23, 2008

(65) Prior Publication Data
US 2010/0119825 A1    May 13, 2010

Related U.S. Application Data

(60) Provisional application No. 60/863,564, filed on Oct. 30, 2006.

(51) Int. Cl.
*B32B 9/00* (2006.01)

(52) U.S. Cl. ........ 428/366; 428/364; 428/397; 428/399; 428/401

(58) Field of Classification Search .................. 428/364, 428/366, 397, 399, 401
See application file for complete search history.

(56) References Cited

U.S. PATENT DOCUMENTS

| | | | |
|---|---|---|---|
| 3,711,908 A * | 1/1973 | Broers | 445/50 |
| 6,903,499 B2 * | 6/2005 | Terui et al. | 313/309 |
| 2005/0133254 A1 * | 6/2005 | Tsakalakos | 174/261 |

* cited by examiner

*Primary Examiner* — Andrew Piziali
(74) *Attorney, Agent, or Firm* — Advent IP, P.C., L.L.O.

(57) ABSTRACT

The present invention comprises nano obelisks and nanostructures and methods and processes for same. The nano obelisks of the present invention are advantageous structures for use as electron source emitters. For example, the ultra sharp obelisks can be used as an emitter source to generate highly coherent and high energy electrons with high current.

11 Claims, 11 Drawing Sheets

CRYSTALLINE NANOSTRUCTURES

CROSS-REFERENCE TO RELATED APPLICATIONS

This application is a U.S. National Application of International Application PCT Application No. PCT/US2007/083037 filed on Oct. 30, 2007, which claims the benefit of priority from U.S. Provisional Patent Application No. 60/863,564 filed on Oct. 30, 2006. The disclosures of International Application PCT Application No. PCT/US2007/083037 and U.S. Provisional Patent Application No. 60/863,564 are incorporated herein by reference.

FIELD OF THE INVENTION

This invention relates generally to ultra sharp nano obelisks, and nanostructures made of low work function materials, and methods and processes for same.

BACKGROUND OF THE INVENTION

Recent materials research has suggested that the Carbon nanotubes are considered by some to be the most promising electron emitting materials because of their small tip radius (approx. 4 nm), which leads to a significant improvement in turn on voltage and current density over current devices. (See M. S. Wang et al., *J. Phys. Chem. B* 2006, 110, 9397-9042; N. Jonge et al., *Nature* 2002, 420, 393-395, 461; W. Zhu et al., *Appl. Phys. Lett.* 1999, 75, 873-875) In another example, lanthanum hexaboride ($LaB_6$) nanowire synthesized by Zhang et al. shows current densities that are one order of magnitude larger than commercial W/ZrO tips (i.e., the brightest commercially available field emitting material) at more favorable working conditions (e.g., room temperature and 800 V versus 1800° C. and 3000 V). (H. Zhang et al., *Adv. Mat.* 2006, 18, 87-91)

However, in view of at least the foregoing, a need exists for the development of high aspect ratio nano-structures for use in electron emitting materials could enhance the emission properties of current devices while simultaneously making the working conditions more practical.

BRIEF SUMMARY OF THE INVENTION

The present invention comprises nano obelisks and nanostructures, and methods and processes for same.

The nano obelisks of the present invention are advantageous structures for use as electron source emitters.

These and other advantageous features of the present invention will be in part apparent and in part pointed out herein below.

BRIEF DESCRIPTION OF DRAWINGS

For a better understanding of the present invention, reference may be made to the accompanying drawings in which.

DETAILED DESCRIPTION OF THE INVENTION

The present invention comprises nano obelisks, and nanostructures and methods and processes for same.

The nano obelisks of the present invention are advantageous structures for use as electron source emitters. For example, the ultra sharp obelisks can be used as an emitter source to generate highly coherent and high energy electrons with high current. These obelisks are useful for the fabrication of highly efficient field electron emitters with various applications ranging from electron guns to field emission displays. For example, the obelisks of the present invention can be used a electron gun construction materials for fabrications of better electron guns which use less energy and provide higher and more coherent current with lower extraction voltage. In this embodiment, the electron guns can be used as electron source for electron microscopes. The electron guns can also be used as electron source for generation of soft x-rays and/or gas ionizers. The electron guns can also be used as electron source for field emission displays such as Surface-conduction Electron-emitter Display (SED). The electron guns can be used for electron beam lithography. The electron guns can also be used for a very intense, local x-ray source. Such an x-ray source could be used for killing cancer tumors, or other medical procedures requiring accuracy and localization.

In an embodiment of the present invention, the nano obelisks comprise lanthanum hexaboride ($LaB_6$). Lanthanum hexaboride is among the group of materials with the lowest work function. Accordingly, lanthanum hexaboride needs only a very small amount of input energy to emit one electron. Also, lanthanum hexaboride is relatively inert to oxidation. In this embodiment, the materials and the crystalline form of these materials have been used as electron emitter sources (i.e., electron guns) ranging from electron microscopes to the electron guns in cathode ray tube (CRT) displays or televisions.

In another embodiment, the nano obelisks comprise the elements or mixture of elements of the lanthanide series combined with hexaboride. In another embodiment, the nano obelisks comprise neodymium iron boride. In another embodiment, the nano obelisks comprise calcium hexaboride ($CaB_6$). In another embodiment, the nano obelisks comprise metallic hexaboride. In another embodiment, the nano obelisks comprise mixed metallic hexaboride. In another embodiment, the nano obelisks comprise hexaboride combined with an iron, iron boride, iron silicon boride, or the like.

In another embodiment, the nano obelisks comprise hexaboride combined with a material that can be used for magnetic RAM. In a further embodiment, the nano obelisks comprise hexaboride combined with a material that can be used for permanent magnetic RAM.

The present invention generates high intensity electron currents and currents with more coherence in a field emission set up by generating materials with a high aspect ratio. For example, as discussed previously, carbon nanotubes have been proposed as the next generation of field electron source materials because of their metallic property and high aspect ratio as a tubular form. However, the lanthanum hexaboride materials of the present invention have a lower work function ($\Phi$) than carbon nanotubes. In one embodiment, the lanthanum hexaboride has a work function of approximately 2.6 eV compared to a carbon nanotube work function of approximately 5.0 eV. In this embodiment, lanthanum hexaboride with a small tip radius approximating that of carbon nanotubes can be used to generate a higher possible electron current density (J) in a field emission setup. This is demonstrated in the following utilization of the modified Fowler-Nordheim relationship as an estimate:

$$J=1.5\times10^{-6}((V/d)^2\gamma^2/\Phi)*\exp((10.4/\sqrt{\Phi})-(6.44\times10^9\Phi^{1.5}d/\gamma V))$$

where $J=I/A$, I is the emission current, A is the emission area, V is the applied voltage, d is the anode-cathode separation distance, and $\gamma$ is the field enhancement factor due to the aspect ratio of the field emitter and anode-cathode separation distance. (Bonard, J., et al., *Phys. Rev. Lett.* 2002, 89, 197602).

The field enhancement factor $\gamma$ for a cylinder model is:

$$\gamma = 1.2\left(2.5 + \frac{h}{r}\right)^{0.9}\left[1 + 0.013\left(\frac{d-h}{d}\right)^{-1} - 0.033\left(\frac{d-h}{d}\right)\right]$$

where h is the cylinder height terminated by a half-sphere of radius r.

Accordingly, in this embodiment, the lanthanum hexaboride nano obelisk can out perform carbon nanotubes.

The present invention comprises a method and process for making the obelisks of the present invention. In one embodiment, the present invention comprises a chemical vapor deposition and a vapor-liquid-solid growth mechanism to synthesize ultra sharp metallic boride obelisks with 3 to 100 nanometers in radii, with the majority between 5 and 20 nm. In this embodiment, a reaction temperature range, chemicals, catalysts and substrates are applied to fabricate materials with optimum shapes. This embodiment is advantageous over conventional and normal procedures which utilize boron sources (e.g., diborane, pentaborane, and boron halides) to synthesize metallic boride nanomaterials. While the use of decaborane to synthesize metallic boride is known, the use of decaborane combined with metal catalyst to synthesize metallic boride nanomaterials is not.

Figure 1:
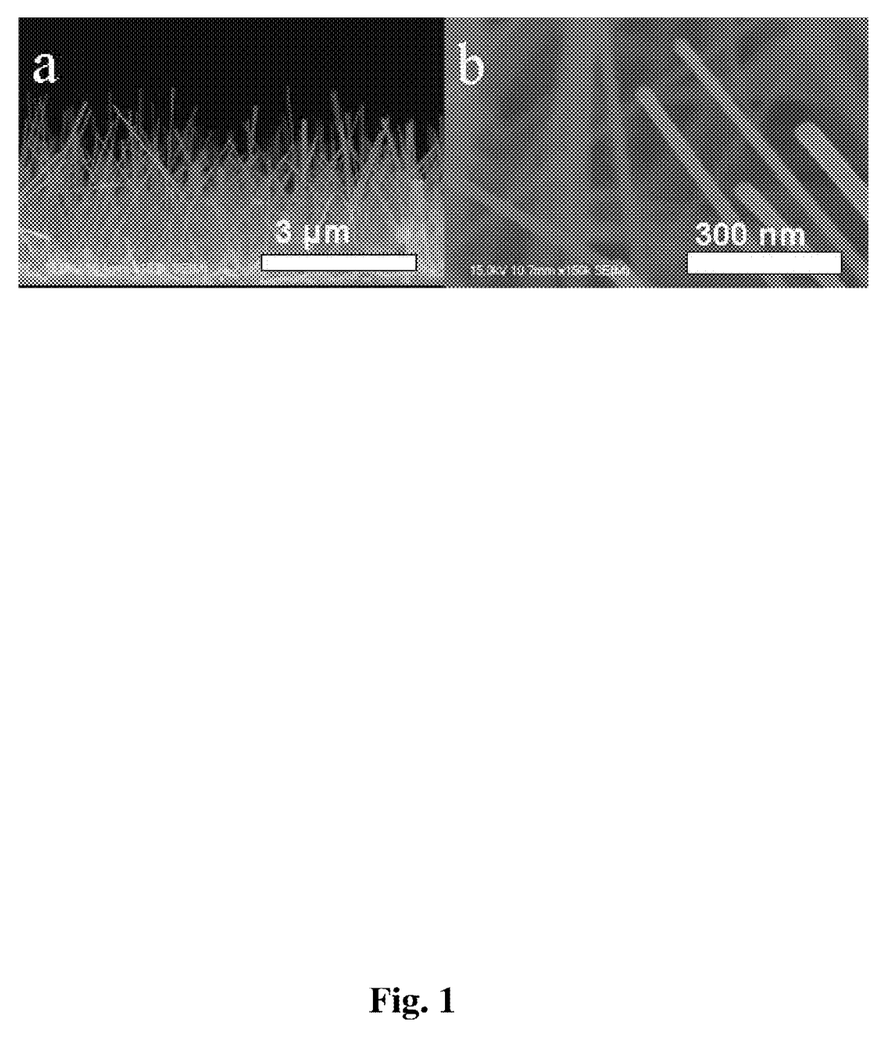
FIG. 1 is a scanning electron microscope (SEM) image of lanthanum hexaboride nanomaterials growth, at low precursor material flux, of the present invention.
Figure 2:
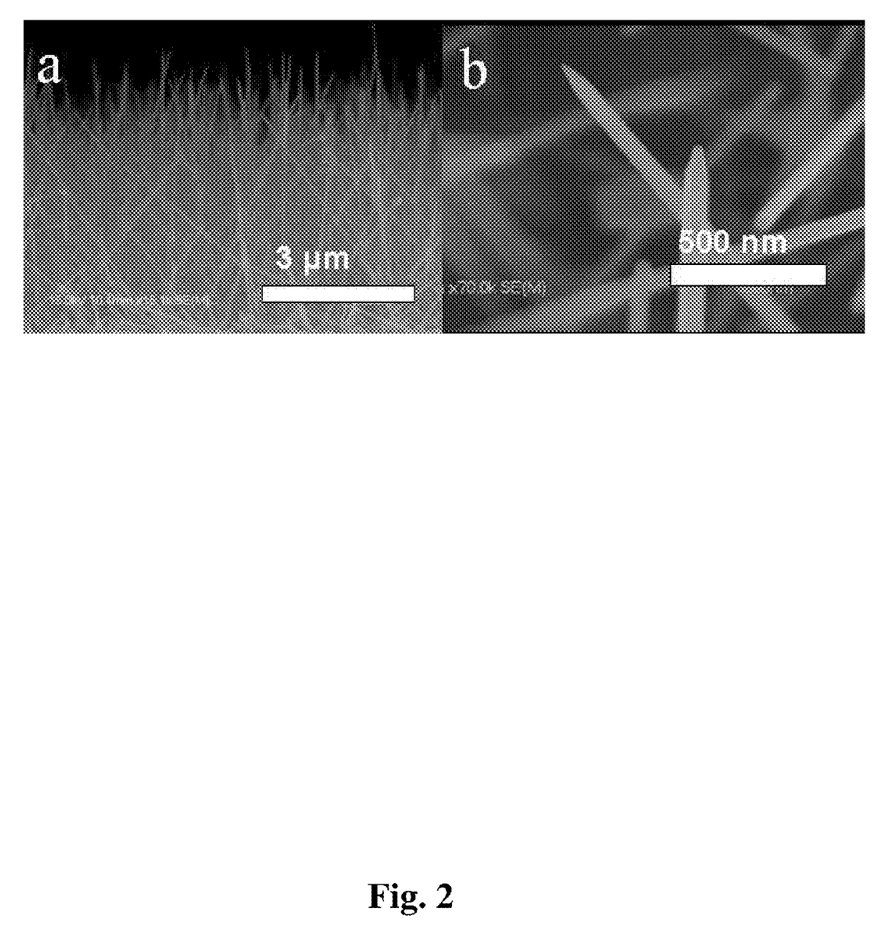
FIG. 2 is a SEM image of lanthanum hexaboride nanomaterials growth, at medium precursor material flux, of the present invention.
Figure 3:
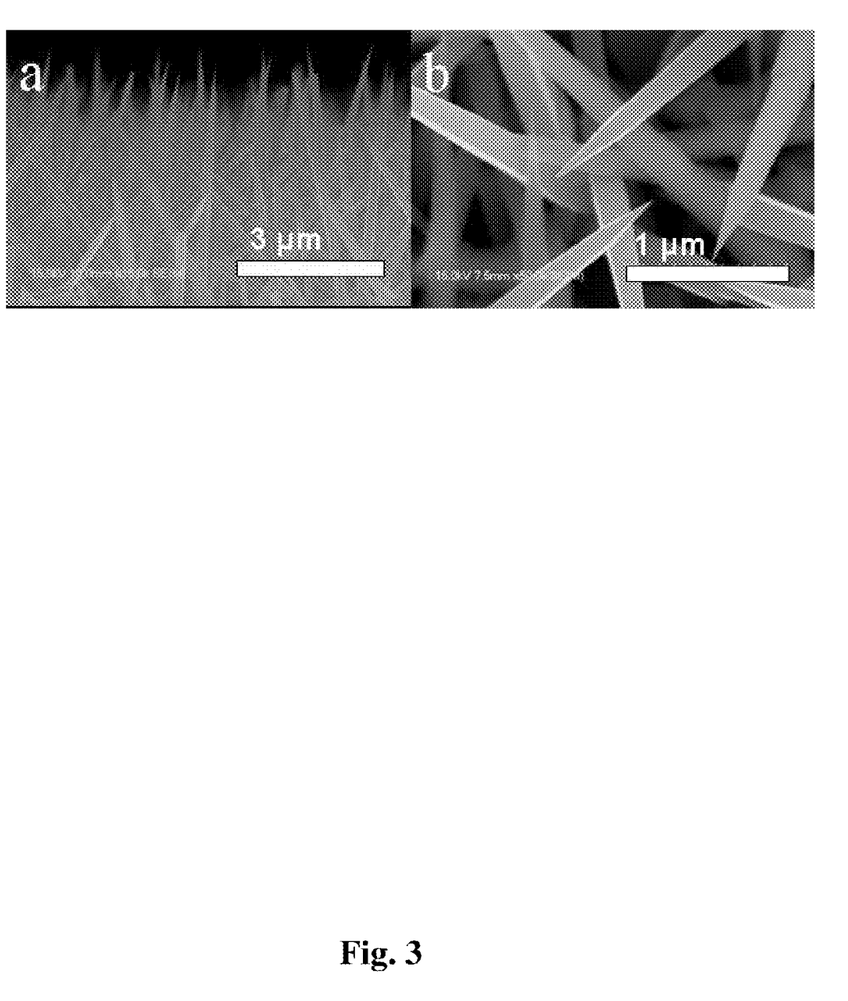
FIG. 3 is a SEM image of a stage of lanthanum hexaboride nanomaterials growth, at high precursor material flux, of the present invention.

FIGS. 1, 2 and 3 are SEM image of $LaB_6$ nanomaterials of the present invention.

Figure 4:
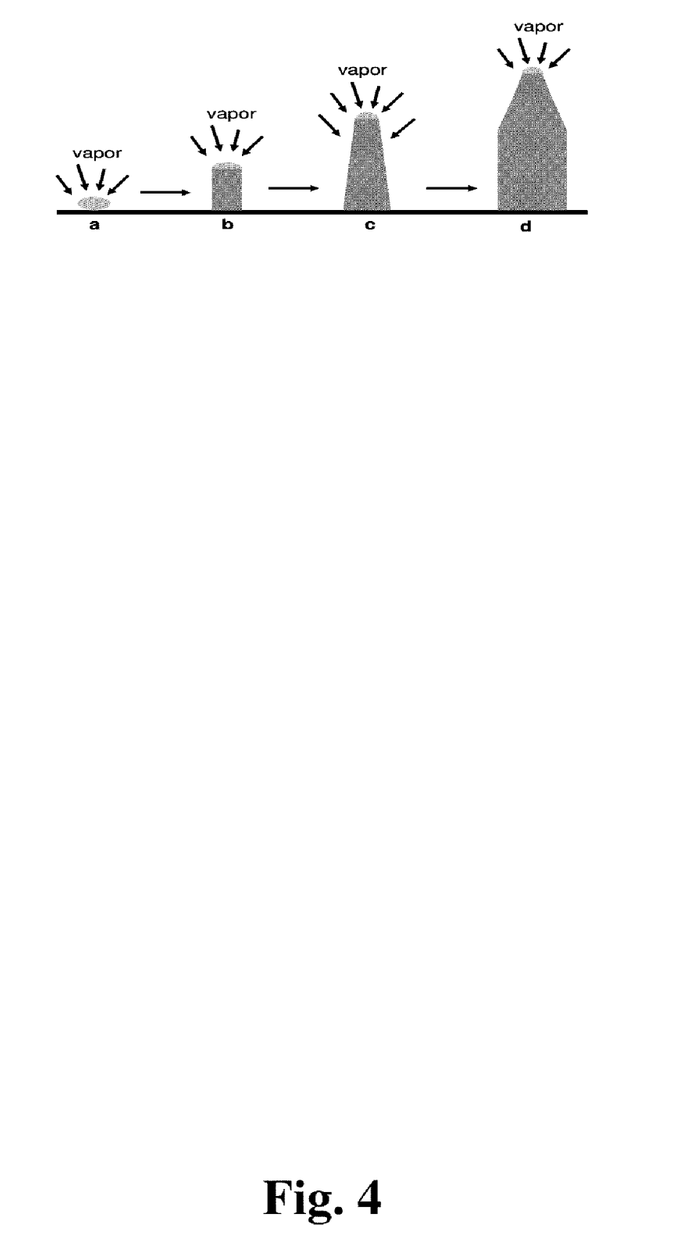
FIG. 4 is a schematic illustration depicting a growth mechanism of the present invention.

According to one embodiment of the invention, the growth mechanism comprises the following chemical formula:

In this embodiment, the growth mechanism comprises four stages. In the first stage, vapor phase lanthanum and boron dissolve in a platinum particle and react. In the second stage, as the platinum particle becomes saturated, $LaB_6$ begins to precipitate out at the liquid-solid interface. Stage 3 is the subsequent vertical growth of nanomaterials after precipitation begins. In the fourth stage, given a high enough flux of materials, a spike shape occurs when the vertical VLS growth is in competition with a much slower secondary deposition. Continued vertical growth and secondary deposition in this high flux regime leads to the final obelisk shape once material flow is halted after 10 minutes.

At least one advantage of the present invention is the avoidance of conventional boron sources that are very toxic and/or flammable for the synthesis of metallic boride nanomaterials. This embodiment, in contrast, utilizes decaborane to synthesize metallic boride nanomaterials. Decaborane is a more benign chemical source than conventional toxic and/or flammable boron sources. Accordingly, this embodiment is a much safer chemical for large scale production of such metallic nanomaterials.

Another advantage of the present invention is that the temperature ranges under which the present invention is practices can be variable. This choice of the temperature ranges allows adapting of the catalyst particle size at a controllable rate to generate the sharp obelisks.

Another advantage of the present invention is that the materials are less expensive than known procedures. For example, in an embodiment of the present invention, decaborane is utilized as a boron source. This embodiment is advantageous as decaborane is much cheaper than the commonly used boron sources such as diborane or boron halides. For example, boron halides as a boron source are at least three- to five-times more expensive than decaborane as a boron source.

Another advantage of the present invention is the obelisk shape of the materials. As previously discussed, known procedures utilize nanowires or nanotubes. These nanowires or nanotubes are uniform in diameter. However, this uniform-diameter nanowire or nanotube shape is disadvantageous because the shape is too flexible. In contrast, the obelisk shape of the present invention is advantageous because the obelisk shape is more robust. The non-uniformity of diameter, in an obelisk embodiment, contributes to a more robust shape than the nanowire or nanotube.

In an embodiment of the present invention, the nano obelisks comprise lanthanum hexaboride. Lanthanum hexaboride ($LaB_6$) comprises thermal and thermionic electron field emitting materials for use in, for example, transmission electron microscope (TEM) and scanning electron microscope (SEM) because of its low work function (~2.6 eV), low volatility, low chemical reactivity with oxygen at room and possibly at higher temperatures, and high brightness. (Gesley, M., et al., Surf. Sci. 1984, 146, 583; Swanson, L. W., et al., *Surf Sci.* 1981, 107, 263). The brightness of the field emitter source is proportional to the current density, J, of the emitted electrons and can be described by the modified Fowler-Nordheim equation (Bonard, J. M., et al., *C. Phys. Rev. Lett.* 2002, 89, 197602):

$$J=((1.5\times10^{-6}/\phi)(V/d)^2\gamma^2\exp((10.4/\sqrt{\phi})-(6.44\times10^9\phi^{1.5}d/(\gamma V))) \quad (1)$$

where $J=I/A$, I is the emission current, A is the emission area, V is the applied voltage, d is the anode-cathode separation distance, $\phi$ is the work function of the material and $\gamma$ is the field enhancement factor due to the aspect ratio of the emitter and the anode-cathode separation distance. J can be increased by either increasing the aspect ratio of the material or lowering $\phi$. Though multi-walled and single-walled carbon nanotubes have been given considerable interest as electron field emission sources recently, their associated work functions, ~4.8 eV and ~5.1 eV respectively, substantially higher than that of $LaB_6$ (Jonge, N., et al., T. H. *Nature* 2002, 420, 393-

395; Wang, M. S., et al., Q. J. *Phys. Chem. B* 2006, 110, 9397-9402; Gao, R., et al., *App. Phys. Lett.* 2001, 78, 1757-1759; Shiraishi, M., et al., *Mat. Res. Soc. Symp. Proc.* 2001, 633, A4.4.1-6). Other materials, such as ZnO, CuS, W, $W_{18}O_{49}$, Si, and SiC have also received attention as possible field emitting materials. (He, Y., et al., *App. Phys. Lett.* 2006, 88, 223107; Wei, A., et al., *App. Phys. Lett.* 2006, 88, 213102; Chen, J., et al., *App. Phys. Lett.* 2002, 80, 3620-3622; Lee, Y.-H., et al., *App. Phys. Lett,* 2002, 81, 745-747; Zeng, B., et al., *App. Phys. Lett.* 2006, 88, 213108; Deng, S. Z., et al., *App. Phys. Lett.* 2006, 89, 023118). Nevertheless, the limiting factor for using these materials is their high work function, assuming they have similar aspect ratios. Thus, $LaB_6$ tips of the present invention, synthesized with dimensions comparable to carbon nanotubes, are expected to out-perform carbon nanotubes and other recently developed materials with larger field emission current and lower applied voltage.

Recently, Zhang et al synthesized $LaB_6$ nanowires with diameters from several tens of nanometers to more than 100 nm. (Zhang, et al., *J. Am. Chem. Soc.* 2005, 127, 2862-2863; Zhang, et al., *adv. Mater.* 2006, 18, 87-91). The emission current density of these nanowires of 200 nm diameters at an extraction voltage of 800 V and room temperature was estimated to be $\sim 5 \times 10^5$ A cm$^{-2}$, which is an order of magnitude larger than that of the state-of-the-art W/ZrO thermal field emitter that works at 1800° C. and 3000 V. These nanowires have an emission current density of the same order of magnitude as a single-walled carbon nanotube bundle under similar conditions. However, long, thin, and flexible structures are undesirable for electron emitter sources for high resolution electron microscopy. Structurally more robust materials with a small tip diameter are less susceptible to thermal vibration and thus are expected to provide better stability. Moreover, as in the case for carbon nanotubes, (Wang, et al., *J. Phys. Chem. B* 2006, 110, 9397-9402) better control of tip shapes and diameters which are crucial in the reproducibility of emission current have yet been demonstrated for $LaB_6$ nanomaterials.

FIG. 4 is a schematic illustration depicting a growth mechanism of the present invention. FIG. 4(*a*) shows a schematic illustration of a precursor vapor saturating a Pt particle and forming a liquid alloy. FIG. 4(*b*) shows initial growth at low flux material. FIG. 4(*c*) shows initial growth at high flux with secondary deposition. FIG. 4(*d*) shows final shape of high flux growth.

Figure 5:
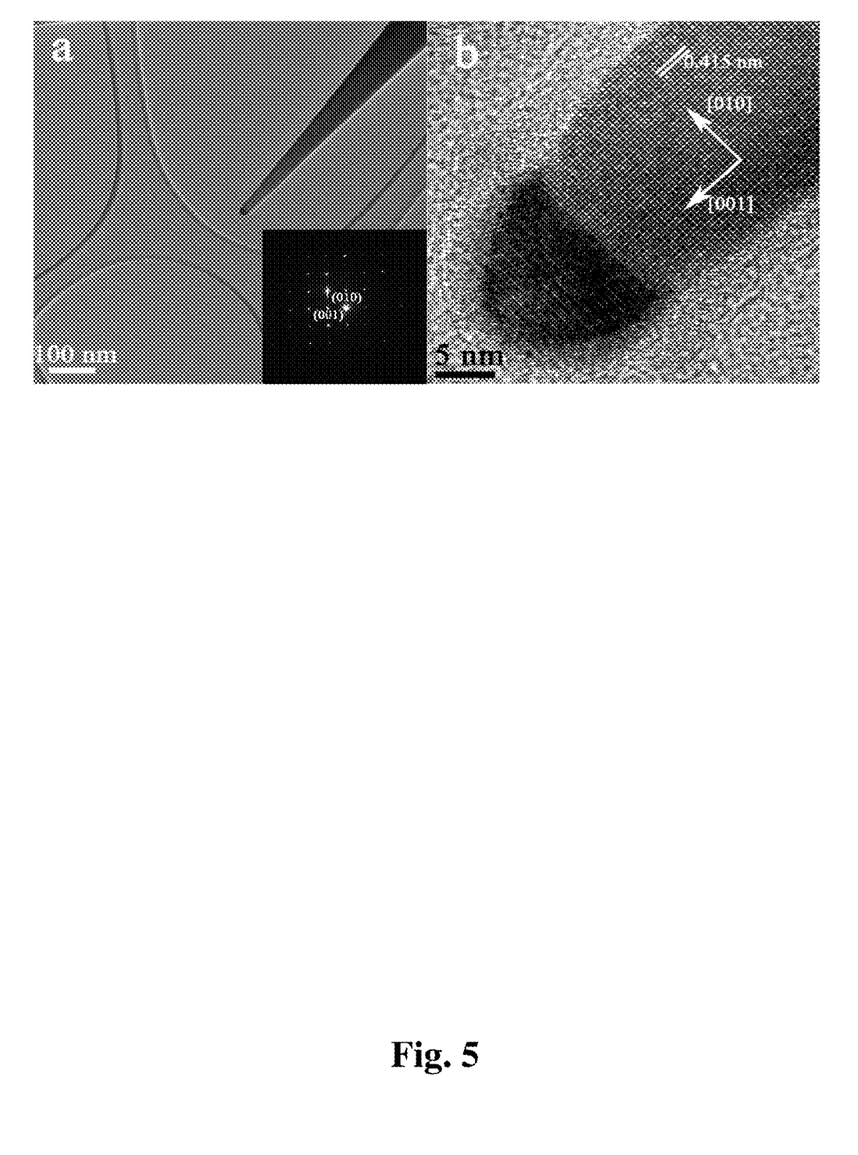
FIG. 5 shows a tunneling electron microscope (TEM) images of a lanthanum hexaboride nano-obelisk of the present invention.

FIG. 5 shows TEM images of $LaB_6$ nano obelisks synthesized in the high flux regime. FIG. 5(*a*) is a low magnification of TEM image of the nanowire with SAED inset. FIG. 5(*b*) is a HRTEM image showing lattice fringes and growth direction.

Figure 6:
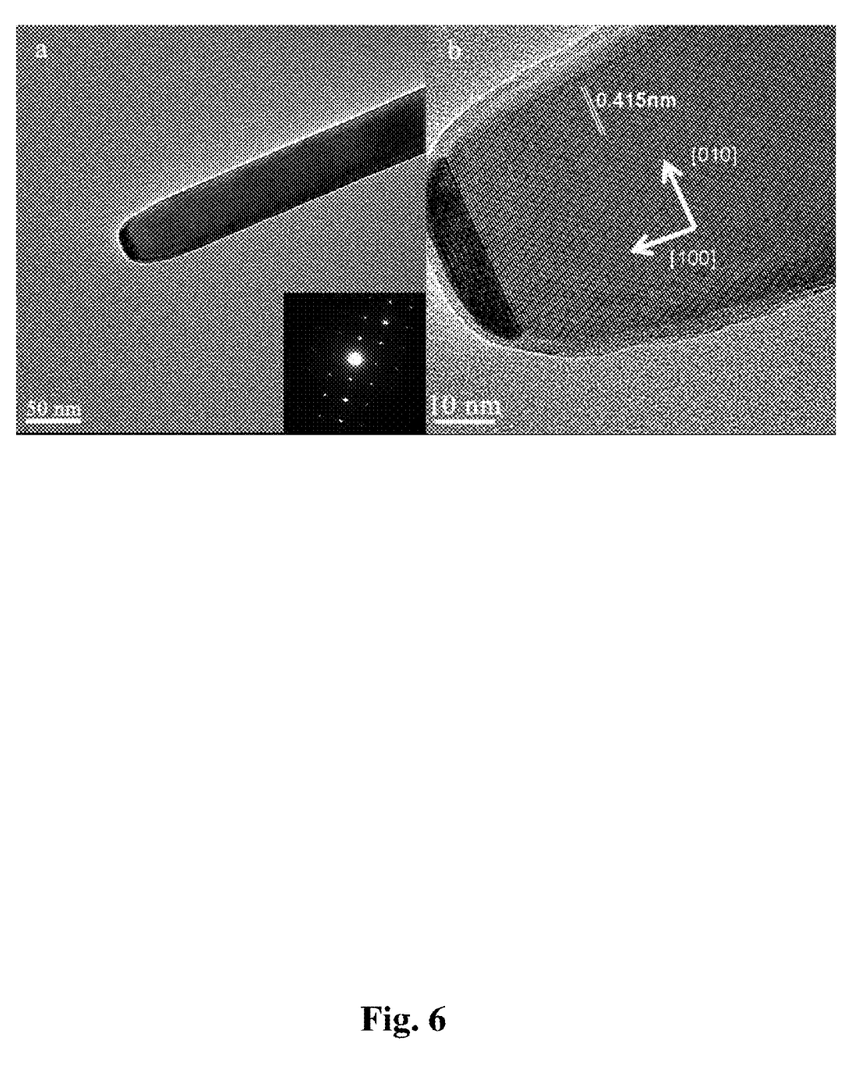
FIG. 6 shows a TEM images of lanthanum hexaboride nanowire of the present invention.

FIG. 6 shows TEM images of $LaB_6$ nanowires synthesized in the law flux regime. FIG. 6(*a*) is a low magnification TEM image of the nanowire with SAED inset. FIG. 6(*b*) is a HRTEM image showing lattice fringes and growth direction.

Figure 7:
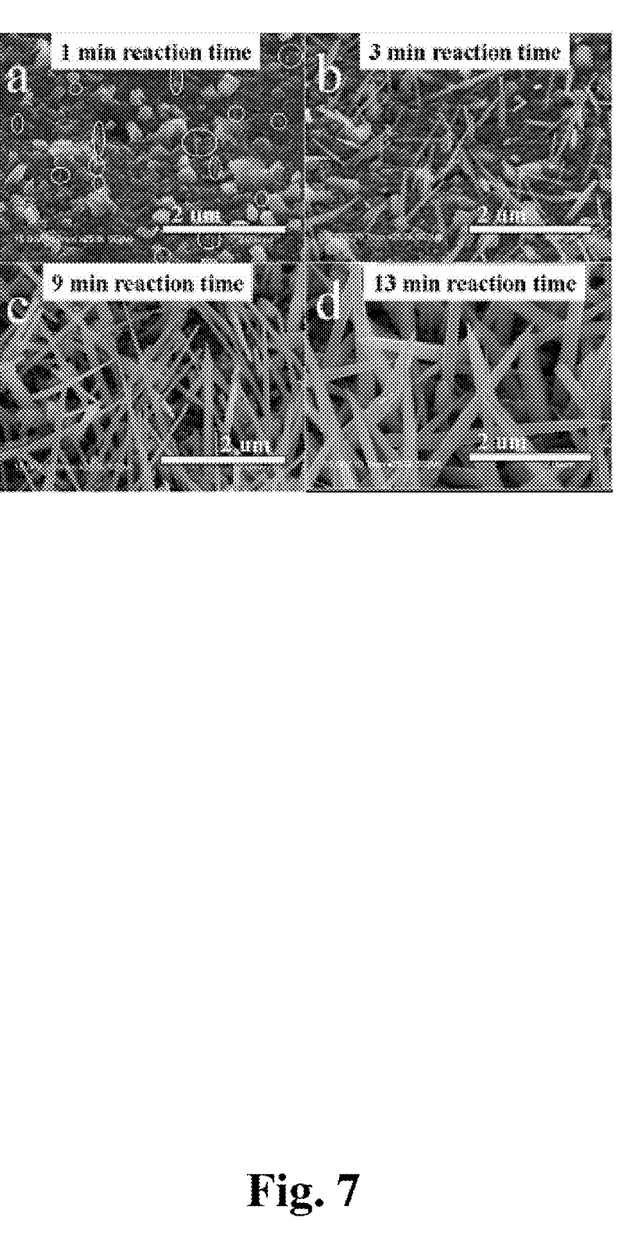
FIG. 7 shows an SEM images of a time trial growth of the lanthanum hexaboride nano-obelisk of the present invention.

FIG. 7 shows an set of SEM images of lanthanum hexaboride nano-obelisks over a period of time. FIG. 7(*a*) shows growth after a reaction time of one (1) minute. FIG. 7(*b*) shows growth of the same nano-obelisks after a reaction time of three (3) minutes. FIG. 7(*c*) shows growth of the same nano-obelisks after a reaction time of nine (9) minutes. FIG. 7(*d*) shows growth of the same nano-obelisks after a reaction time of thirteen (13) minutes.

Figure 8:
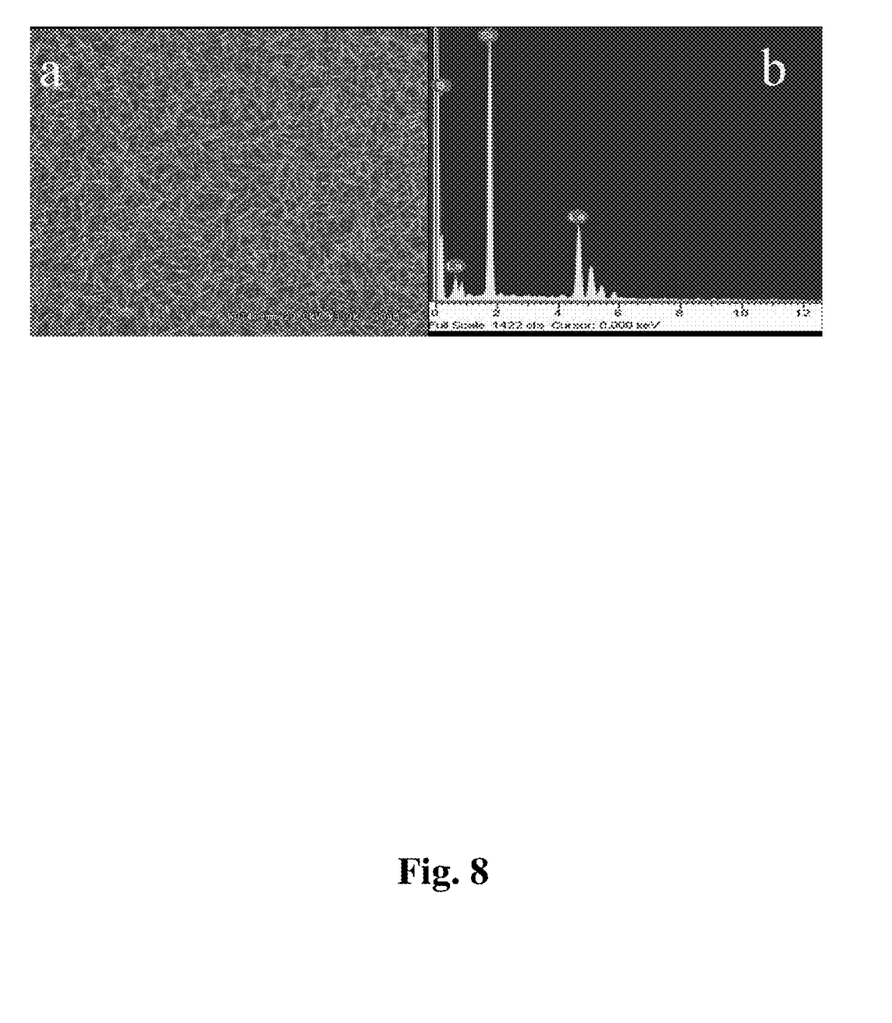
FIG. 8 shows a set of SEM images an EDX scan of the lanthanum hexaboride nano-obelisk of the present invention.

FIG. 8 shows an SEM image and a corresponding EDX scan. The scan reveals that the only detectable elements are B, La, and Si (the Si signal originating from the substrate).

Example 1. Shape control synthesis of $LaB_6$ nanostructures from nanowires to nano-obelisks and their characterizations. We applied an adapted chemical vapor deposition (CVD) scheme (Kher, et al., *J. Phys. Chem Solids* 1998, 59, 1343-1351) via a vapor-liquid-solid (VLS) mechanism to produce single crystalline nanostructures with well-defined growth direction, better uniform tip diameters and denser wire growth than previously reported results. (Zhang et al., *Am. Chem. Soc.* 2005, 127, 2862-2863; Zhang et al., *Adv. Mater.* 2006, 18, 87-91; Givargizov et al., *J. Less-Common Met.* 1986, 117, 97-103; Kher, S. S.; Spencer, J. T. *J. Phys. Cem Solids* 1989, 59, 1351).

The synthesis is based on the chemical reaction below (Peshev, P. *Journal of Solid State Chemistry* 2000, 154, 157-161):

$$10LaCl_{3(s)} + 6B_{10}H_{14(g)} \rightarrow 10LaB_{6(s)} + 30HCl_{(g)} + 27H2_{(g)} \qquad (2)$$

Our process was conducted at a temperature lower than other reported $LaB_6$ nanowires or whiskers synthesis, (Zhang et al., *J. Am. Chem. Soc.* 2005, 127, 2862-2863; Zhang et al., *Adv. Mater.* 2006, 18, 87-91; Givargizov et al., *J. Less-Common Met.* 1986, 117, 97-103) with boron precursors of much lower toxicity and a more thermodynamically favored reaction. (Peshev, P. *Journal of Solid State Chemistry* 2000, 154, 157-161). The reaction was performed in a tube furnace operated at 1000° C. and a pressure of 140 mtorr for 10 minutes. The sublimed decaborane was introduced into a 1" quartz tube at a flow rate of 0.75 sccm and subsequently mixed with argon at a flow rate of 10 sccm. Precursor $LaCl_3$ (0.2 g, Sigma-Aldrich) was located on a quartz boat in the up-stream end of the furnace. Silicon substrates coated with platinum nanoparticles (Henglein et al., *J. Phys. Chem.* 1995, 99, 14129-14136) of majority diameter 16±10 (1σ) nm were placed at several positions down stream on the same quartz boat. Resulting materials were characterized using a JEOL JEM-2010 TEM operated at 200 kV with an Oxford EDX, a Phillips CM300 TEM operated at 300 kV and a Hitachi S4700 Field-Emission SEM operated at 15 kV.

$LaB_6$ nanostructures of shapes evolving from nanowires to nano-obelisks can be synthesized by strategically controlling the secondary deposition of materials with substrates placed at up- and down-stream positions in the furnace. FIGS. 1, 2 and 3 show typical SEM images of the wires and obelisks products. At down-stream, only nanowires were obtained, whereas at the up stream obelisk-shape products accounts for greater than 95% of the materials present on these samples, with nanorods accounting for the remaining structures. The tip diameters of as-synthesized nanostructures are typically from 3 to 50 nm, with majority between 5 and 20 nm for the obelisks, and 20 to 30 nm for the wires. Both wires and obelisks are generally of several micrometers in length. The base width of the obelisks ranges from 150 to 290 nm, with about a 15% variation over a 2 m length. The wires have a relatively uniform diameter with <10% variation over the entire length.

TEM images of the nano structures in tips are depicted in FIGS. 5 and 6 with their corresponding selected area electron diffraction pattern confirm single crystalline nature of the nanowires and nano-obelisks with mostly <001> growth direction and 0.415 nm cubic lattice spacing. Dark regions were found at the end of most obelisks and wires which indicates the presence of platinum catalyst particles at the tips. The size of the platinum particles corresponds well with their initial size prior to growth, which further implies a VLS nanostructure growth process.

The shape control of the as-synthesized nanostructures can be attributed to a two-part growth mechanism consisting of VLS vertical growth and secondary deposition depicted in FIG. 4. Initially a $LaB_6$ thin film forms on the substrate surface. During this stage, Pt particles remain on the surface of the $LaB_6$ film until the film is thick enough. FIG. 4(a) illustrates the liquid alloying of the platinum nanoparticles with the gas mixture of lanthanum and boron. Subsequent vertical growth of nanowires happens when vapor-saturated catalysts particle lifts off to precipitate the wires via the typical VLS process at a low boron flux regime (FIG. 4(b)). During the wire growth, there is little secondary deposition process competing with the VLS growth. However, if the wire growth occurs in the up-stream regions of higher boron flux, the wires will develop a spike shape initially (FIG. 4(c)) and only after significant growth does the material take on the shape of FIG. 4(d). The enhanced secondary growth of the wires is probably due to a fairly constant volume per unit length secondary deposition which competes with the much faster VLS vertical growth. In such case, the rate of increase in diameter of the nanostructure would be faster for sections with smaller diameter. Thus, the overall diameter variation along the longitudinal direction is expected to be not as much as a wide-base cone structure as in other works (Tutuc et al., App. Phys. Lett., 2006, 88, 043113) than an obelisk shape. The fact that obelisks with much shorter tips can be synthesized by placing substrates in region with medium boron flux also infers the dual stage growth mechanism with slower VLS growth rate and secondary deposition. Time trial growth study of the nanostructure shape evolution further supports the proposed growth mechanism.

FIG. 8(a) shows an SEM image of $LaB_6$ nano-obelisks. FIG. 8(b) shows an EDX spectrum of the sample in (a). The image reveals high yield of nano-obelisks. EDX spectrum indicates that the detectable elements in the sample (B, La, and Si). The Si signal originates from the substrate. The signal from Pt catalyst particles is too small to be noticeable when compared to the elements in the bulk sample in the spectrum.

Figure 10:
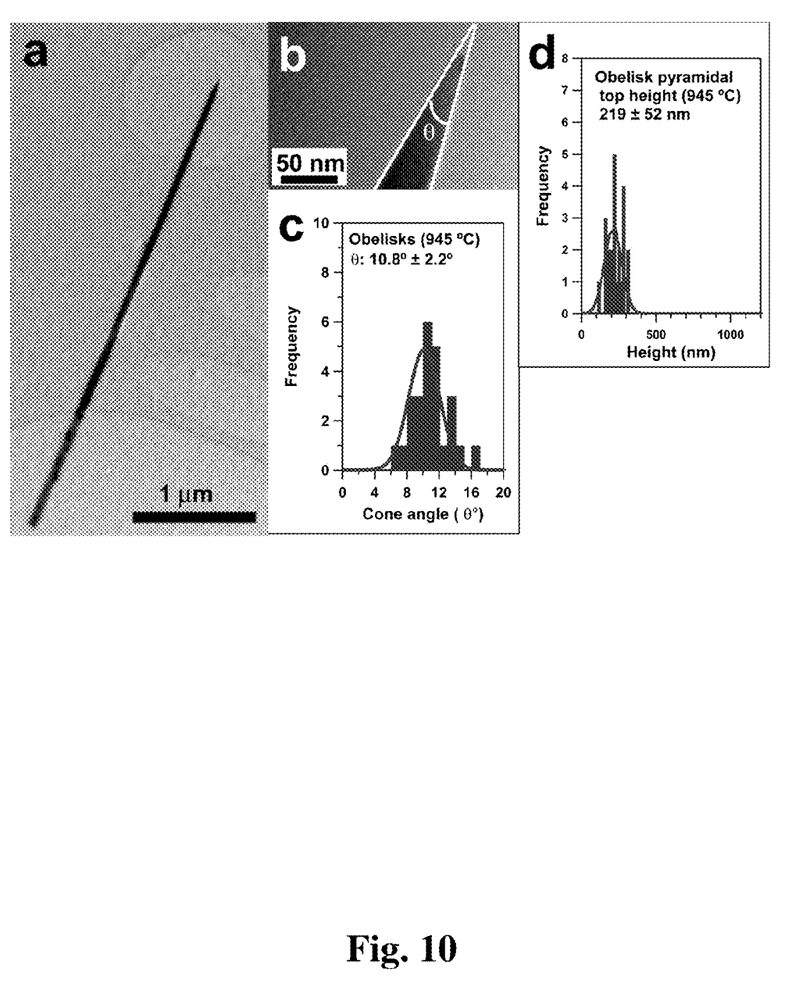
FIG. 10 is a set of TEM images of an $LaB_6$ nano-scale obelisk, and histograms of tip angles and the heights of the pyramidal tops for a sample.

With regard to time trial growth study of the shape evolution of $LaB_6$ nano-obelisks, FIG. 10 shows a time trial growth study of the $LaB_6$ nano-obelisks shape evolution carried out by repeating the experiments with similar conditions but with different length of reaction time 1, 3, 9 and 13 minutes. SEM images of the resulting products reveal that the shapes of the nanostructures follow the growth model as depicted in FIG. 4. FIGS. 7(a), (b), (c) and (d) are the results from the 1, 3, 9 and 13 minute runs respectively. The images are all taken at the same magnification to emphasize the materials change in length and diameter. Circles in (a) indicate the locations of wires.

Figure 9:
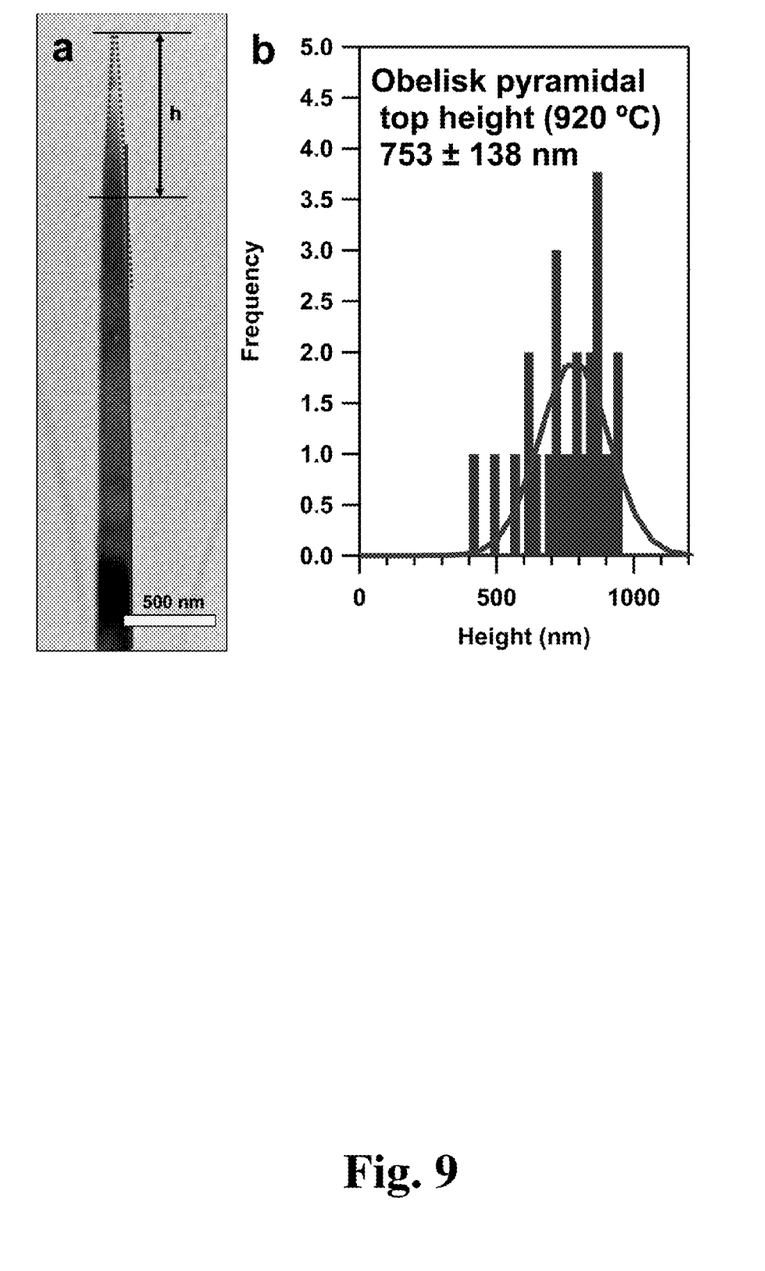
FIG. 9 shows a TEM image of an $LaB_6$ nano-scale obelisk, and a histogram of pyramidal top heights.

Referring to FIG. 9(a), a TEM image of a $LaB_6$ nano obelisk shows a shaft body and a pyramidal section having a tip at its apex. The height of the pyramidal section is measured from the tip to a point where a tangent from the tip of the pyramidal section intersects a tangent extending along the body shaft. FIG. 9(b) is a histogram of pyramidal top heights, h, of $LaB_6$ nanoobelisks synthesized at 920° C. The solid and dashed lines in (a) represents the slope of the base or shaft body and pyramidal top, respectively. The intersection point of the red and blue lines was referenced as the base of the pyramidal top.

The $LaB_6$ obelisk-shaped nanostructures are typically characterized by their rectangular pyramidal tops on 4-sided shafts with wider bases. Nanoobelisks of different defined pyramidal top heights, cone angles and shaft widths can be preferentially obtained by judicious placement of the substrates in a 2 cm long 920-945° C. growth zone down stream from the lanthanum precursor. At the lower temperature growth zone (~920° C.) 3-cm down-stream from the $LaCl_3$, preferentially growth of nanoobelisks was obtained at a frequency of greater than 95%, with rectangular cross-sectioned nanorods accounting for the remaining structures. The pyramidal top of these obelisks typically have tip diameters of 11±5 nm, very sharp cone angles of 8.7°±1.3°, and heights of 753±138 nm. These obelisk shafts adopt a more tapered structure with length of ~4 μm, width of 150-250 nm at the base of the shaft and angle of vertical declination of 0.8°±0.3°, characterized by a ~15% decrease in width over a 2 μm length. High density growth of these nanoobelisks can be routinely obtained.

FIG. 10, includes TEM images of a $LaB_6$ nanoobelisk synthesized at 935° C. with its cone angle histogram. FIG. 10(a) is a low magnification TEM image of a nanoobelisk and FIG. 10(b) is a zoom-in TEM image of the obelisk tip. FIG. 10(c) is an histogram of the obelisk cone angles, θ, and FIG. 10(d) is an histogram of the heights of the pyramidal top of this sample.

At higher temperature growth zone (~945° C.) 4-cm away from the La precursor, $LaB_6$ nanoobelisks with much shorter pyramidal tops and uniform width along the length of the shaft were obtained instead. Compared to materials grown in lower temperature growth zone, the pyramidal tops of these structures typically have wider tip diameters of 13±9 nm, shorter heights of 219±52 nm. However, the cone angles of these tips remain sharp (10.8°±2.2°). While the length of these shorter tip obelisks is in general ~5 μm, their shaft is mostly of uniform width (85±10 nm) with less then 20% variation over the entire length of the structure, which correlates to an angle of vertical declination at the base of 0.35°±0.15°. At the highest temperature growth region (~960° C.) 5-cm away from the La precursor, $LaB_6$ nanowires were grown instead. These wires were also capped by Pt particles and had diameter distribution of 30±20 nm. Control experiments without the catalysts under the same conditions yielded only $LaB_6$ films instead.

The chemical identity and crystallinity of these $LaB_6$ nanoobelisks were examined by TEM and EDX elemental analysis. High resolution TEM images along with the selected area electron diffraction patterns reveal the single-crystalline nature of the $LaB_6$ nanoobelisks with exhibited lattice spacing of ca. 4.15 Å. Growth directions of these nanostructures are determined to be mostly along the [001] direction. Dark regions, indicative of a high z material, are found at the ends of most obelisks and wires. Elemental mapping of the obelisk by EDX confirms the presence of boron and lanthanum in the appropriate regions of these obelisk structures. The silicon signal in the EDX spectrum is attributed to background contaminations from silicon substrates. The copper signal is from the copper TEM grid. The EDX spectrum at the edge of the nanoobelisk also reveals the identity of the thin amorphous coating, typically several nanometers thick, to be over-coated boron. The EDX spectrum at the obelisk tip indicates that the dark region is a Pt-rich material containing boron and lathanum, suggesting that a vapor-liquid-solid growth mechanism may be involved in the materials growth.

Figure 11:
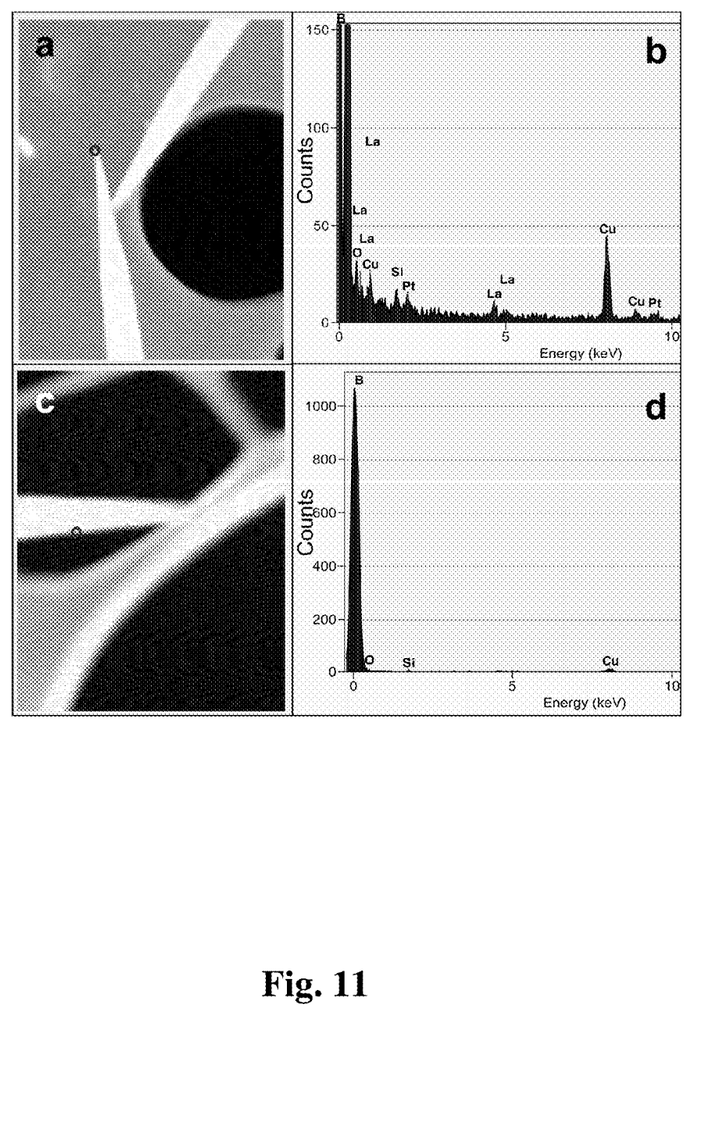
FIG. 11 is a set of scanning transmission electron microscope (STEM) images of an $LaB_6$ nano-scale obelisks and EDX spectra at different points on the obelisk.

FIG. 11, shows STEM images and EDX spectra at the tip and the edge of a 920° C. $LaB_6$ nanoobelisk, respectively. The circles indicate the locations on the obelisk where the EDX spectra were measured. A rectangular window was used for the EDX measurement along the edge of the obelisk. FIG. 11(b) shows the EDX spectra at the tip, and FIG. 11(d) shows the EDX spectra at the edge.

In conclusion, we developed a CVD process for high density shape-control growth of single crystalline $LaB_6$ nanostructures with various shapes and uniform tip diameters of tens nanometers or smaller and lengths of several microns. Possible applications for these materials include thermionic, field-induced, and thermal field-induced electron emission for TEM and SEM, flat panel displays, thermionic energy converters and any other electrical devices that require high efficiency electron emitting source.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A nano-scale obelisk comprising metal hexaboride, the obelisk having a pyramidal portion including a tip, and a shaft, wherein the tip has a diameter of less than 50 nm, and wherein the tip has a diameter that is substantially less than the diameter of the shaft.

2. The nano-scale obelisk of claim 1, wherein the tip has a diameter of about 5 nm to about 20 nm.

3. The nano-scale obelisk of claim 1, wherein the tip has a diameter of less than 50 nm and a uniform diameter the length of the wire.

4. The nano-scale obelisk of claim 1, wherein the shaft body has a nominal diameter of smaller than 500 nm.

5. The nano-scale obelisk of claim 1, wherein the shaft body has a diameter of about 150 nm to about 290 nm.

6. The nano-scale obelisk of claim 1, wherein the body diameter of the obelisk varies by no more than about 15% along the length of the body.

7. The nano-scale obelisk of claim 1, wherein the metal hexaboride comprises elements of the lanthanide series, yttrium, calcium, zirconium or mixtures thereof, combined with hexaboride.

8. The nano-scale obelisk of claim 1, wherein the metal hexaboride has a work function of no more than about 5.0 eV.

9. The nano-scale obelisk of claim 8, wherein the metal hexaboride has a work function of no more than about 2.6 eV.

10. A nano-scale obelisk comprising:
    a metal hexaboride having a work function of no more than about 5.0 eV;
    the obelisk having a tip having a diameter of about 3 nm to 50 nm and a body having a nominal diameter of about 150 nm to 290 nm;
    and the nano-scale obelisk has a length of about 3 microns to about 10 microns.

11. The nano-scale obelisk of claim 10, wherein the tip has a diameter of about 5 nm to 20 nm.

* * * * *